(12) United States Patent
Pecqueur et al.

(10) Patent No.: US 8,559,788 B2
(45) Date of Patent: Oct. 15, 2013

(54) PROCESS FOR PLACING A MULTIMEDIA OBJECT IN MEMORY, DATA STRUCTURE AND ASSOCIATED TERMINAL

(75) Inventors: Remi Pecqueur, Puteaux (FR); Fabien Demilly, Maurepas (FR)

(73) Assignee: Apple Inc., Cupertino, CA (US)

( * ) Notice: Subject to any disclaimer, the term of this patent is extended or adjusted under 35 U.S.C. 154(b) by 1350 days.

(21) Appl. No.: 12/153,083

(22) Filed: May 13, 2008

(65) Prior Publication Data
US 2008/0292281 A1   Nov. 27, 2008

(30) Foreign Application Priority Data

May 14, 2007  (FR) ...................................... 07/03465
Jun. 15, 2007  (FR) ...................................... 07/04294

(51) Int. Cl.
| | |
|---|---|
| *H04N 9/80* | (2006.01) |
| *H03M 13/00* | (2006.01) |
| *H04L 12/26* | (2006.01) |
| *H04W 4/00* | (2009.01) |
| *G06F 3/12* | (2006.01) |
| *G06F 11/00* | (2006.01) |
| *G06F 15/16* | (2006.01) |

(52) U.S. Cl.
USPC .......... 386/239; 358/1.15; 370/252; 370/328; 370/333; 370/338; 709/203; 709/246; 709/247; 714/4.2; 714/10; 714/15; 714/776

(58) Field of Classification Search
USPC ......... 386/239, E5.001; 358/1.15; 375/E7.04, 375/E7.075; 376/328; 709/246, 247, 203; 370/252, 328, 333, 338; 714/4.2, 10, 714/15, 776
See application file for complete search history.

(56) References Cited

U.S. PATENT DOCUMENTS

| | | | | |
|---|---|---|---|---|
| 5,951,694 | A | * | 9/1999 | Choquier et al. ................ 714/15 |
| 6,618,832 | B1 | * | 9/2003 | Schweidler et al. .......... 714/776 |
| 7,948,933 | B2 | * | 5/2011 | Ohayon et al. ................. 370/328 |
| 2003/0067627 | A1 | * | 4/2003 | Ishikawa et al. ............. 358/1.15 |
| 2005/0275752 | A1 | | 12/2005 | Li et al. |
| 2008/0259844 | A1 | * | 10/2008 | Richeson et al. ............. 370/328 |

OTHER PUBLICATIONS

Singer D. et al., "Proposed Revised Common Text Multimedia File Format Specification", International Standard ISO/IEC, pp. I-IV , 1, (Mar. 21, 2002).
French Preliminary Search Report and Annex page for French Application No. 07/04294, dated Mar. 18, 2008.

* cited by examiner

*Primary Examiner* — Thai Tran
*Assistant Examiner* — Syed Hasan
(74) *Attorney, Agent, or Firm* — Wong, Cabello, Lutsch, Rutherford & Brucculeri LLP

(57) ABSTRACT

Process for placing a multimedia object comprising at least one elemental data stream in memory by a terminal receiving the said elemental stream or streams, the said stream or streams being received by the terminal in the form of data packets comprising a data part and a header comprising serial numbers, comprising a stage of placing the data parts of packets received in a data object, a stage of creating a hint track comprising elemental records relating to data packets, these elemental records being placed in memory in sequence according to the serial numbers of the packets received and including a reference to the data in the said packets within the data object, and further comprising a stage of creating elemental records corresponding to non-received packets within the said hint track, these elemental records being placed in memory in the sequence in the locations where the corresponding elemental records would have been placed in memory had the packets been received.

11 Claims, 3 Drawing Sheets

PROCESS FOR PLACING A MULTIMEDIA OBJECT IN MEMORY, DATA STRUCTURE AND ASSOCIATED TERMINAL

This application claims priority to French Patent Application Nos. 07/03465, filed 14 May 2007, and 07/04294, filed 15 Jun. 2007, the entire contents of each of which are hereby incorporated by reference.

This invention relates to a process for the recording of broadcast multimedia objects and more particularly the recording of these multimedia objects in a form which makes it possible to easily supplement the recording by data remotely loaded subsequent to the recording stage.

It is known that multimedia objects comprising broadcast digital services or parts of digital services can be recorded, in particular on hard disks. These multimedia objects generally comprise audio and/or video streams, data corresponding to a service guide (name of service, supplier, description, url, etc.), or again meta-data relating to programmes (start and end times). Broadcasting may take place via any of the forms currently in use, for example by satellite, cable, radio waves and also via communication networks such as IP networks, where this takes the form of a flow of IP data such as in the system known by the name of Data Cast IP, standardised by DVB Digital Video Broadband, or BCAST, standardised by the Open Mobile Alliance Consortium. This material is broadcast to receiving terminals. These terminals are provided with receiving means and generally with means for acquiring and playing back multimedia objects. In some circumstances these terminals may also be provided with memory means through which multimedia objects received can be recorded with a view to subsequent playback. Many file formats can be used for placing recorded services in memory with a view to playing back independently of the broadcast. Among these formats, the format known by the name of MPEG-4 ISO file format has become widespread and is used by many service playback devices. This format is in particular described in the documents <<ISO/IEC 14496/12 Information technology—Coding of audio-visual objects—Part 12: ISO base media file format>> and <<ISO/IEC 14496/14 Information technology—Coding of audio-visual objects—Part 14: MP4 file format>>. FIG. 1 summarises the general architecture of this file format. It is an object-orientated file format. A first overall object describes the file itself: This is the ISO file object, given the reference 1.1. This object may include a film object, reference 1.2, which includes the data relating to an audiovisual presentation. Such an audiovisual presentation comprises audio tracks and video tracks which are combined to play back the presentation. Useful multimedia data which comprise most of the data for a service are placed in memory in a data object called mdat, for media data, reference 1.8. Film object 1.2 contains an initial object descriptor 1.3 providing references for the other objects in the file. It also includes a "track" object for each file track. These track objects, references 1.5 and 1.6 in FIG. 1, relate to corresponding multimedia data in the data object mdat, 1.8. The file may contain a BIFS (Binary Format for Scene) object which is used to describe scenes, reference 1.4. To sum up, the file format comprises information data relating to objects present in the said format and the data, known as payload, referenced by these information data. If the file has to be broadcast as streaming, it also includes at least one track, known as the direct video/audio playback track, which describes the formation of packets for reading by a multimedia file reader. The file also contains at least one hint track 1.7 which describes the formation of packets for broadcasting in a server mode. This hint track 1.7 is an object which depends on the protocol used for broadcasting. Thus several hint track objects may reference the same film object from the same file. The RTP, FlexMux or MPEG-2 transport stream protocols are protocols which among others are used to reference multimedia objects via hint tracks. In the case of broadcasting by means of the RTP (Real Time Protocol) protocol on IP (Internet Protocol), there is generally a hint track for each elemental multimedia track, whether that track is an audio track or a video track. In fact the RTP protocol provides for the broadcasting of each elemental track via an independent RTP session. This hint track is in most cases associated with the direct playback track. This means that the data pointers in the hint track point directly to the data pointers in the direct playback track which point to the useful data. In some embodiments hint track pointers point directly to useful information without referencing other tracks.

When a terminal receives a broadcast multimedia object and wishes to save it, a file having such a structure has to be created in memory means. These memory means may be a hard disk, for example, or a memory or any other peripheral, including a network, which is capable of placing a large quantity of data in memory. Where further broadcasting of the said recorded multimedia objects will be processed as further broadcasting, it will be necessary to add audiovisual hint track and context data through which the broadcast stream can be constructed. In this case the terminal starts by analysing the various elemental streams which it receives, creates the associated hint structures, and then begins to place the data received in a data object, such as object 1.8 in FIG. 1, in memory.

When content placed in memory is played back and in the first operating mode, everything happens as if it were a broadcast. The content is read from the file and broadcast to the module responsible for playing back that content, which acts in a similar way as when playing back content actually broadcast to the terminal. In order to handle this pseudo-broadcasting within the terminal, in which the terminal is itself a client server, hint tracks have to be created in the file placed in memory. These hint tracks indicate the format on the basis of the broadcasting protocol, for example RTP. These tracks comprise a succession of elemental records pointing to the data in the content. These elemental recordings may for example comprise the RTP serial number, the time stamp of the RTP packet and a pointer to the data in the direct playback track which has a pointer to the data comprising the content of the said file corresponding to the payload of the RTP packet. The data pointer in the hint track can also point directly to the data comprising the content of the said file corresponding to the payload. The creation of these hint tracks and direct playback tracks therefore comprises placing in memory information generally provided by the broadcasting protocol data packet headers in the case of a hint track, and placing in memory time stamp information obtained from the encoders in the case of a direct playback track, plus the payload, plus if appropriate information relating to the broadcasting programme guide. In the case of the recording of a TV programme, the file may in addition to the said programme contain information data about the object relating to the recording such as the serial number, date, time of the said recording and a descriptive summary of the said recorded programme.

The operation of placing content in memory comprises placing the hint track in memory with the content of the data part of the RTP packets in a media data object (mdat) together with the content of the RTP packet headers, at least the serial number, the time stamp and the pointer to the location in the content data object placed in memory in this way in the form of a hint track. The data so placed in memory are formatted as for a medium intended for broadcasting. The hint tracks contain instructions for a broadcasting server which backs up packet formation. These instructions can include data which are to be sent directly by the server (for example header information) or reference segments of the media data. These instructions are encoded in a file format having the same orientation (print-out) as the instructions in a file designed to be read locally. The same data media are used and include hint tracks, whether designed for local playback or for broadcasting using different types of carrier (RTP, etc.). Several hint tracks may be incorporated in the same file without it being necessary to duplicate data. Furthermore, the operation of placing content in memory comprises creating and placing the hint track, the direct playback track with the time stamp and the pointer to the location in the data object of the content so placed in memory, in memory in parallel. The memory operation therefore gives rise to an operation of constructing by accumulation the data object comprising unprocessed multimedia data and a hint track containing references to that multimedia data and a direct playback track containing other references to that multimedia data.

When in a first embodiment the multimedia object so placed in memory is played back, the hint track is followed and the RTP packets are reconstituted from information placed in memory in the hint track for the headers and data referenced, or by double referencing via the direct playback track, for the data part of the packet. The packets so reconstituted can then be transmitted to the IP stack—as if they had been received by the broadcasting system. In a second embodiment the direct playback tracks (audio and/or video tracks) are followed directly by a multimedia reader which reads the time information and associates this with the payload data to decode them without having to pass through the IP stack, and in this case the hint track is not used. During the stage of placing a broadcast multimedia object in memory it may happen that transmission errors give rise to the loss of data packets. One way of overcoming these transmission errors is to request retransmission of the missing packets via an interactive link, such as for example a WiFi or 3G link. Through this link a request is addressed to a recovery server to request the missing packets. These missing packets may be packets which were intentionally not transmitted or were lost during transmission, or again transmitted with errors and therefore discarded on receipt. The HTTP (Hyper Text Transfer Protocol) protocol can for example be used for this purpose. Other error recovery mechanisms may also be used, such as periodical broadcasting of the multimedia programme (carrousel), which comprises retransmittring the programme several times. In this case the packets which are not received in the first transmission, and are therefore not placed in memory, can be recovered during a subsequent retransmission.

Whatever method of recovering missing packets is used, these packets are received late in relation to the packets normally broadcast. In addition to this, some multimedia objects may also be designed on the basis of a modular architecture which allows some data to be broadcast initially, these data enabling the multimedia object to be played back, while additional data may be requested subsequently in order to supplement the object. These may be data which make it possible to increase the quality of playback as well as data flows which make it possible to increase the definition of video images, additional sound tracks providing multichannel playback, or again audio tracks in additional languages. This additional information may be requested during a subsequent stage after the multimedia object has been placed in memory. Thus a hint track constructed by accumulation does not contain the elements relating to these packets which are received late. As far as the data are concerned, the fact that data are accumulated from packets received late after packets previously received during broadcasting does not give rise to any functional problems because these data are used via the pointers placed in memory in the hint track. As far as the hint track is concerned, this track must include information relating to the packets broadcast in sequence. Where an object which has been affected by reception errors is recorded, hint tracks are created with gaps in the sequences. In a first operating mode the late receipt of some packets will result in the need to reconstruct the hint track so that the information relating to packets received late can be inserted in its proper place. The operation consumes a great deal of processing power and memory space because it comprises reconstituting a complete object from several sequentially fragmented objects. In a second mode the multimedia reader must itself reconstitute the hint tracks with several objects. In the case of great data loss, of more than a few seconds, mechanisms such as PLC (Packet Loss Concealment) cannot be applied without the addition of new mechanisms. PLC uses techniques such as insertion (FEC), interpolation or regeneration. The invention is designed to overcome this problem by describing a process for placing a multimedia object in memory, this object comprising elemental streams of multimedia data, and permits the subsequent addition of data relating to packets received late without the need to rewrite hint tracks.

This invention relates to a process for placing a multimedia object comprising at least one elemental stream of data in memory by a terminal receiving the said elemental stream, the said stream being received by the terminal in the form of data packets comprising a data portion and a header comprising serial numbers, comprising a stage of placing the data parts of packets received in memory in a data object, a stage of creating a hint track comprising elemental records relating to data packets, these elemental records being placed in memory in sequence according to the serial numbers of the packets received and comprising a reference to the data in the said packet within the data object, and further comprises a stage of creating elemental records corresponding to packets not received within the context of the said hint track, these elemental records being placed in memory in the sequence in places where the corresponding elemental records would have been placed in memory had the packets been received.

According to a particular embodiment of the invention the serial numbers of packets not received are placed in memory in elemental records corresponding to these non-received packets.

According to a particular embodiment of the invention the process further comprises a stage of recovering non-received packets subsequent to creation of the said hint track.

According to a particular embodiment of the invention this stage of recovering non-received packets includes the dispatch of a recovery request to a recovery server, and the receipt of data comprising non-received packets in response to the said request.

According to a particular embodiment of the invention, non-received packets form the entire stream of elemental data which can be used to supplement the multimedia object.

According to a particular embodiment of the invention the process further comprises a stage of placing information relating to the number and location of missing packets in memory.

This invention also relates to a data structure placing a multimedia object comprising at least one elemental stream of data in memory, the said elemental stream or streams being capable of being broadcast in the form of data packets comprising a data portion and a header comprising serial numbers, comprising a data object placing the said data or the said streams in memory, at least one hint track comprising elemental records relating to data packets which are capable of being broadcast, these elemental records being placed in memory in sequence according to the serial numbers of the said packets and comprising a reference to the data in the said packet within the data object; the structure further comprising elemental records corresponding to packets whose data are not placed in memory in the data object within the said hint track, these elemental records being placed in memory in sequence in those places where the elemental records corresponding to these packets would have been placed in memory had the corresponding data been placed in memory in the data object.

According to a particular embodiment of the invention, at least one of the said elemental records corresponding to packets whose data are not placed in memory in the data object comprises a reference to a strategy for handling missing data.

This invention also relates to a terminal for receiving a multimedia object comprising at least one elemental stream of data, the said stream or streams being received by the terminal in the form of data packets comprising a data part and a heading comprising serial numbers, comprising means for placing the data parts of packets received in a data object, means for creating a hint track comprising elemental records relating to data packets, these elemental records being placed in memory in sequence according to the serial numbers of the packets received and comprising a reference to the data for the said packet within the data object; the terminal further comprising means for creating elemental records corresponding to non-received packets within the said hint track, these elemental records being placed in memory in the sequence in places where the corresponding elemental records would have been placed in memory had the packets been received.

According to a particular embodiment of the invention the terminal comprises means for displaying information relating to the break time when an incomplete multimedia object is restored.

The abovementioned features of the invention, and others, will be more clearly apparent from a reading of the following description of an embodiment provided in relation to the appended drawings, in which.

Figure 1:
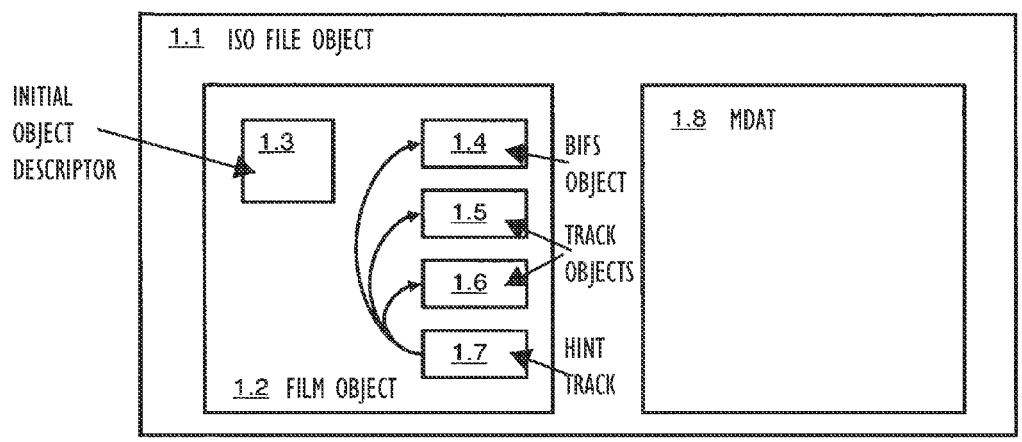
FIG. 1 shows the general architecture of a file according to the MPEG4 standard.
Figure 2:
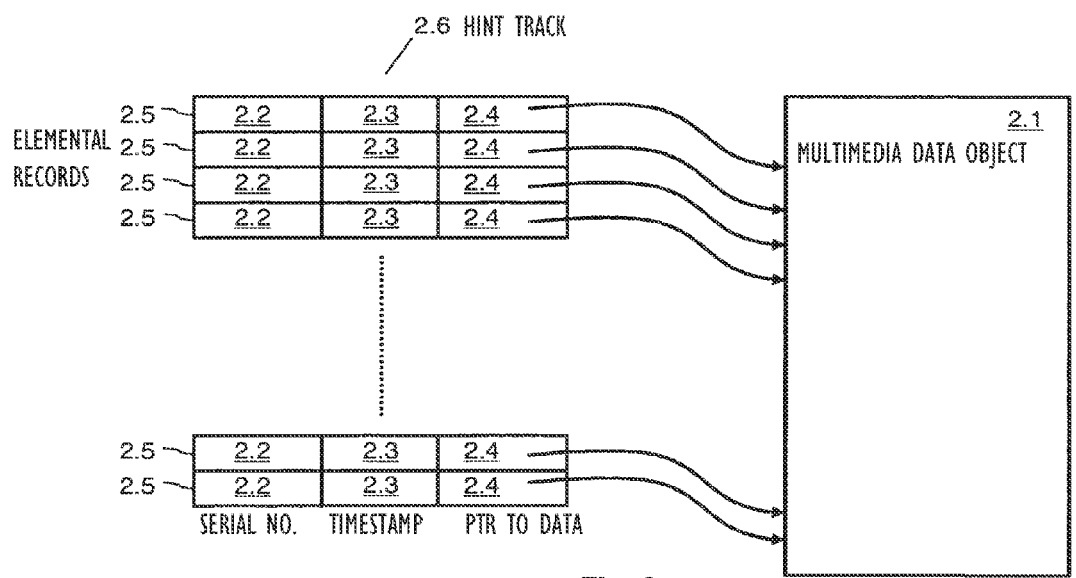
FIG. 2 shows the general architecture of a hint track for multimedia data within an MPEG-4 file.

The structure of a hint track for multimedia data within a MPEG-4 file is illustrated in FIG. 2. This figure shows the hint track, reference 2.6. The multimedia data are placed in a data object mdat, reference 2.1. The hint track constitutes a sequence of elemental records 2.5. Each elemental record can be used to describe a data packet in accordance with the broadcasting protocol used. The embodiment is based on the use of the RTP protocol (Real Time Protocol), but any other protocol may be used; in particular the UDP protocol (User Datagram Protocol) or again the FlexMux protocol may be used directly. The RTP protocol is based on the broadcasting of data in packets comprising a header and a data part. These packets are transmitted within UDP datagrams, their transmission is not acknowledged by the receiver because UDP does not provide for any acknowledgement mechanism. The header of an RTP packet includes a serial number which enables the receiver to reconstitute the sequence of packets transmitted, together with a time stamp for the time when the first bit of the data packet was created. Through this time stamp reception can be synchronised with the transmission of packets in a single RTP session. The data which are to be transmitted are ranked in the data part of the RTP packet. The use of SR transmission reports (Sender Reports) in the RTCP protocol (Real Time Control Protocol) makes it possible to synchronise a number of RTP sessions. This is the case for example for synchronisation between an audio session and a video session. In this case the clock frequencies for all the hint tracks are also recorded and can appear in the form of a description of the SDP session (Session Description Protocol), for example, recorded in the form of information of the user-data type.

A hint track dedicated to the RTP protocol includes records comprising the serial number of the RTP packet which has to be constructed, reference 2.2, a time stamp 2.3 and a pointer to the data which have to be transmitted 2.4. The elemental record of hint track 2.5 may also include other information which is not shown. When a stream of data broadcast using this protocol has to be placed in memory it is sufficient to accumulate data transmitted within the data part of the RTP packets received in multimedia data object 2.1. In addition to this, the hint track is created by adding a sequence of elemental records 2.5 identified using the header data in the RTP packets received. The RTP serial numbers for the packets received are used to determine the order in the sequence of elemental records.

Missing packets can be detected through the serial numbers incorporated in the headers of the RTP packets. These missing packets may have simply been poorly transmitted, or discarded on receipt, or lost during transmission, for example in an overloaded router, or for example when passing through a tunnel. In this case the invention provides for the creation of an elemental record for each missing packet placed in the hint track at the place that the elemental record relating to the missing packet would have occupied had it been received. This elemental record may possibly contain the serial number of the lost packet from an analysis of the serial numbers of the packets received. The time stamp and data pointer are initialised at predetermined values which make it possible to identify the elemental record as being incomplete and not corresponding to data present. The data pointer is for example set to the value zero, comprising a zero pointer. Alternatively it points to a predetermined image, for example in JPEG format, or again points to a particular function which makes it possible to display the break time for the broadcast object, or merely informs the multimedia reader that it must engage in a particular type of reading behaviour or leave the appropriate response to the discretion of the multimedia reader. If this is not the case it presupposes that the broadcasting or recording service provides such an image or function. In fact the difference between the time information relating to a break time, that is to say the time difference between the last packet received before the reception problem and the first packet received, yields the time interval which has to be displayed on screen before it is possible to continue broadcasting, for example, the film object.

In the case of an overloaded network, some packets may arrive out of sequence. The elemental record placed in the broadcast list will then be replaced by the newly received packet with the correct serial number.

Figure 3:
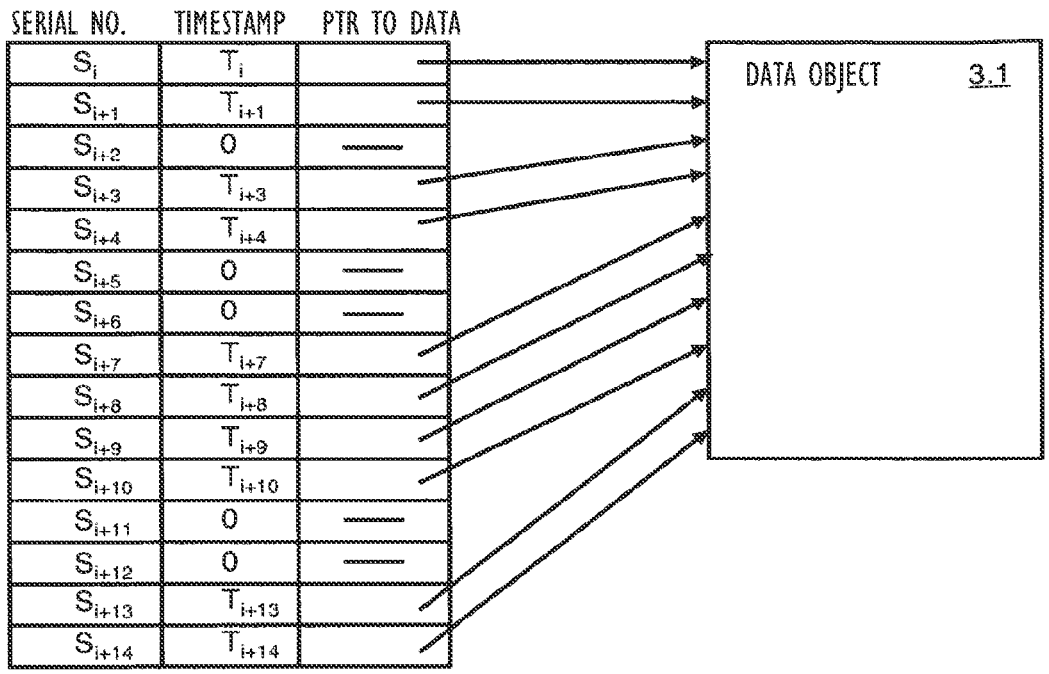
FIG. 3 shows a multimedia data track recorded following broadcasting according to one embodiment of the invention.

This situation is illustrated in FIG. 3. This figure shows the state of a hint track in the embodiment according to the invention following the receipt of 10 RTP packets whose serial numbers $S_i$ to $S_{i+14}$ show that 5 packets have been lost, the packets bearing the serial numbers $S_{i+2}$, $S_{i+5}$, $S_{i+6}$, $S_{i+11}$ and $S_{i+12}$. The data included in the packets received are placed in memory in data object 3.1. The elemental records in the hint track corresponding to the packets received are placed in memory in the hint track and their data are initialised with the data present in the headers of the RTP packets, the serial number $S_i$, the time stamp $T_i$ and the pointer to the packet data in data object 3.1. Elemental records relating to lost packets have been inserted in the hint track. The corresponding serial number is identified, the time stamp is set to zero, while the corresponding pointer is in this embodiment a null pointer represented by the dash.

Following receipt of the broadcast packets, the missing packets are requested via an error recovery mechanism. Several types of mechanisms may be used. For example, the operator controlling broadcasting may use a recovery server. This server has the broadcast content, the same RTP sequencing for recording and reading, and is therefore able to respond to requests requesting the dispatch of particular packets in the broadcast stream. The packets requested may be identified by identification of the multimedia object, the serial number of the packet requested and the start and end time stamps of the breaks as control parameters, among others. This information must be supplemented by the clock frequency of the time stamps for each track at the time of recording or by the time of broadcasting in the case where broadcasting of the multimedia object is sufficiently long to have resulted in the serial number counter starting another cycle. In this case it is also possible to place a sequence counter in memory on receipt, which is incremented with each cycle start. In this case a request is made for the packet having serial number "n" in the $i^{th}$ sequence. The object is placed in memory on the server in a file in MPEG format containing the hint tracks which make it possible to reconstitute a broadcast data packet on request. Where the operator uses several broadcasting protocols for different networks or families of terminals, for example, the file placing the multimedia object in memory contains a number of hint tracks corresponding to the different broadcasting protocols available. It is only necessary to run through the hint track corresponding to the broadcasting protocol used to identify the serial number requested and reconstitute the data packet using the elemental record corresponding to the hint track and the data identified in that record. After broadcasting, following a stage in which missing packets are detected, these packets are then requested from the recovery server by an interactive link. This interactive link may be an IP connection on the telephone system, or a WiFi link, or any other interactive link available to the receiving terminal.

Alternatively, in the case where the terminal has no interactive link or is not able to use its recovery means for any reason, the terminal may restore an incomplete programme in which missing data have not been supplemented. In this case a time count or break time (5 seconds lost) may be displayed to inform the user of the time lost and not reconstituted, to validate use of the object placed in memory. This may be a combination of these two with the possibility of the user being able to jump the break time directly through a key and resume restoration of the programme immediately without waiting for the resumption moment. In this case synchronisation between the various elemental streams has to be maintained. For example it is possible that missing data may affect the video stream but that the audio stream is intact. In this case the video break time can be indicated but the audio stream can continue to be played back. If the user chooses to jump this break time, he will have to jump the corresponding audio information to resume synchronised sound and image playback at the end of the break. So that the terminal managing playback can take decisions relating to playback on the basis of breaks present in the file, their length, their frequency or other factors, information relating to breaks, that is to say the amount and location of missing packets, can be placed in the file. The presence of this information in the data file, for example within the overall object moov, enables the terminal to know this information without having to run through the entire file looking for breaks. The terminal can then decide not to play back a file containing too many breaks, or to state the file quality to the user. These various user experiences can be improved by a file format which can for example provide by way of indicating the number of breaks, the total break time, the percentage of packets not received, or any other information to prevent the terminal from running through the entire file, which may be very large. This information can be dispatched using the protocol described in the hint track or tracks.

The protocol used for this recovery request may be any protocol which makes it possible to send a request to the server and receive data in response to that request. The embodiment of the invention uses the HTTP protocol (Hyper Text Transfer Protocol) which is well suited for this purpose, but any other protocol, for example the RTP protocol may be used via Sender Reports and Receiver Reports.

Figure 4:
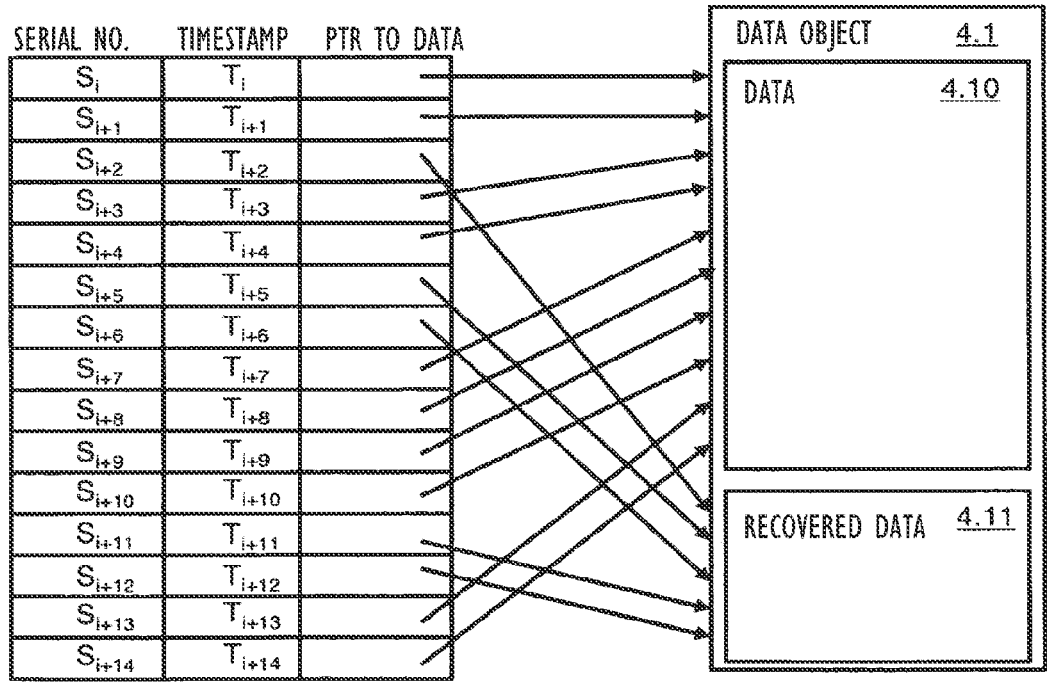
FIG. 4 shows the same track supplemented according to an embodiment of the invention.

The packets so recovered are then inserted into the existing structure without any need to modify that structure. In particular, there is no need to reconstitute the hint tracks in a single file. This insertion is illustrated in FIG. 4. Data are accumulated within the file within data object 4.1 following data 4.10 placed in memory during broadcasting. The block of data within data object 4.1 containing these recovered data is identified as 4.11. Elemental records corresponding to the serial numbers $S_{i+2}$, $S_{i+5}$, $S_{i+6}$, $S_{i+11}$ and $S_{i+12}$ which have been inserted are now identified with data from the headers of the recovered RTP packets. In particular their time stamps $T_{i+2}$, $T_{i+5}$, $T_{i+6}$, $T_{i+11}$ and $T_{i+12}$ are read in the recovered packet headers and are inserted into the corresponding elemental records. While economising on calculation time and processor power, it is found that the file can be supplemented in this way without having to make any changes to its structure.

Alternatively, elemental recording indicating a missing packet is identified by a reference to an object, for example named ErrorSampleEntry, which makes it possible to index or create a new hint track indicating the types of error. The file format may also make records comprising any type of broadcasting protocol such as a transport stream (TS) directly. In this case an application can create an elemental track and identify missing packets by detecting this ErrorSampleEntry object. This elemental track is independent of the broadcasting protocol and does not make any call upon it. An application can then interpret the file and know whether or not it is incomplete without necessarily being capable of interpreting the broadcasting protocol, for example the RTP protocol. This application can then make a request to obtain the missing data using information present in the tracks, particularly using data of the XML type. The interpretation of this ErrorSampleEntry class then allows the software application restoring content to support different types of coders/decoders and hint tracks.

The ErrorSampleEntry object may for example have the following structure:

```
class ErrorSampleEntry extends
SampleEntry('erse') {
/*
Information about management of the error
*/
uint(16) hinttrackversion = 1;
uint(16) highestcompatibleversion = 1;
reference to the type of broadcasting protocol supported, for example
RTP, TS, ES.
....
        }
```

Alternatively, in a particular embodiment of the invention a new type of elemental record is defined. This new type of elemental record can be redirected. It is for example identified by a particular field in the record. In this case, when several packets are missing, only a single elemental redirection record within the hint track located at the place where the elemental records corresponding to the missing packets would have been recorded if they had been received is created. To begin with this elemental redirection record points to the gap. When the missing data are received, the data part is placed in memory in the data object and a section of the hint track corresponding to the packets received late is created. Once this section has been created its address is placed in memory in the elemental redirection record. When the hint track is read, when a redirection record is read the pointer is followed to read the following elemental records belonging to the section. On reaching the end of the section reading is resumed at the elemental record following the elemental redirection record.

It is also possible to make provision for complete hint tracks which do not include empty elemental records designed to receive further supplementary information. For example, when a programme is broadcast and the broadcast is recorded—tracks are then created corresponding to the video and audio streams received. Hint tracks corresponding to other languages can also be created. These hint tracks then comprise empty elemental records because no audio stream corresponding to these languages has been received at the time of broadcasting. At the user's request it is subsequently possible to use an interactive channel to request the dispatch of data corresponding to the audio stream for another language and identify the values of the corresponding elemental records. In this way the initial file recorded can once again be supplemented without having to alter its structure.

In the case where a terminal has to restore an incomplete file, that is to say a file containing element streams from which some packets are missing, a number of strategies may be used by the terminal to deal with these missing parts or breaks. A first strategy comprises restoring nothing during the break, that is a black screen for the video or no sound for the audio. Another strategy comprises displaying information about the length of the break on screen. It is also possible to provide the user with a choice of waiting until the end of the break or continuing directly with the rest of the programme. The terminal can also chose to restore prerecorded content which it has in memory. Instead of an empty pointer within the element record corresponding to a missing packet, a reference to a preferred strategy for handling the break can be placed in memory. The terminal attempting to restore an incomplete file then finds a reference to the desired strategy for handling the break. It can then apply or chose to ignore that instruction.

Likewise it is possible to supplement a video track with supplementary streams which make it possible to improve quality. This can be done for example in the context of hierarchical coding, where a first low resolution video stream is broadcast. This stream is suitable for display on a mobile terminal having a small screen. When the stream is recorded provision is also made for recording hint tracks for supplementary streams containing additional information in order to obtain better resolution playback. Here again these supplementary data may be requested via an interactive channel and supplement the initial file in order, for example, to display the programme on a television screen or any other screen which can take advantage of better resolution. Supplementary data may also be requested by a device other than that which made the recording if the recorded file is transferred to that other item of equipment. It is for example possible to record the multimedia object on a portable telephone and then transfer it to a computer or a decoder connected to the television and there request supplements from the operator for the programme via domestic access to the Internet.

Figure 5:
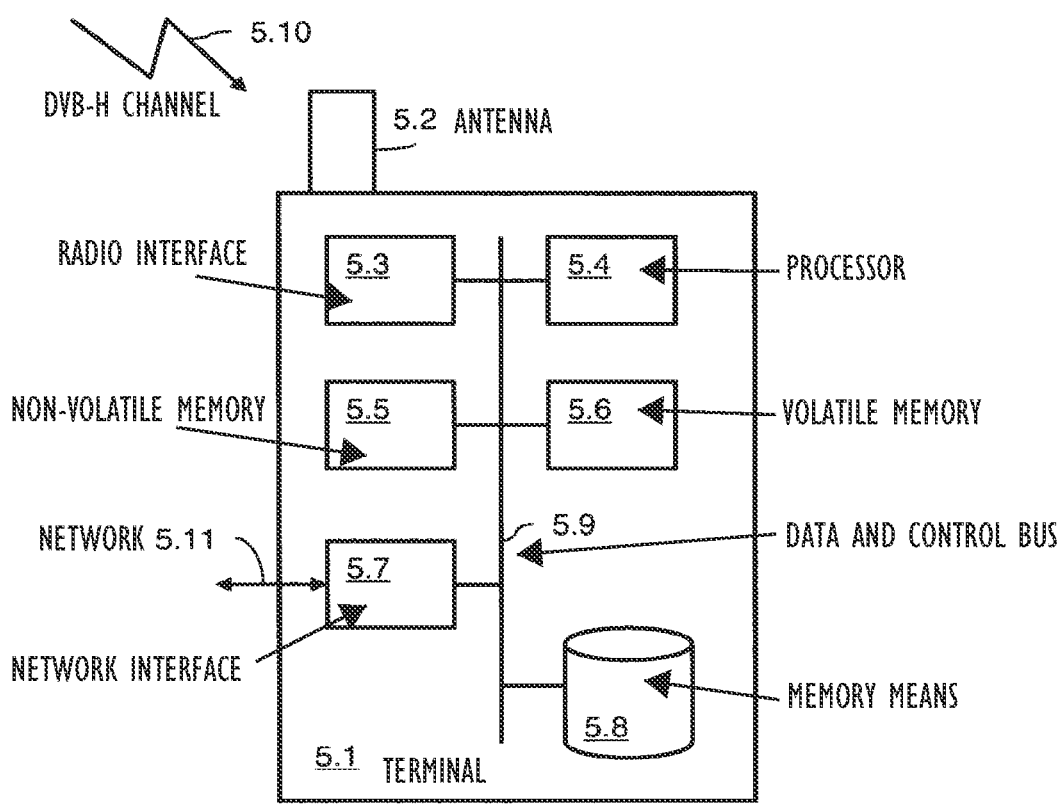
FIG. 5 shows the architecture of a receiving terminal according to an embodiment of the invention.

FIG. 5 illustrates an example of a receiving terminal according to the invention. This terminal 5.1 is a mobile telephony receiver fitted with a receiving antenna 5.2 which can transmit and receive telephone calls. Furthermore, this antenna also makes it possible to receive broadcast data such as multimedia objects via, for example, a DVB-H channel, reference 5.10. The terminal is provided with a radio interface 5.3 capable of processing signals which are to be transmitted or received by antenna 5.2. The terminal is operated under the control of a processor 5.4 by means of software programs placed in non-volatile memory 5.5. These programs use volatile memory 5.6 as a working memory. Terminal 5.1 of the embodiment according to the invention is provided with at least one other network interface 5.7 such as a WiFi wireless interface providing a connection to an interactive network such as the user's domestic network or any public access point providing access to the internet. It may also be a USB (Universal Serial Bus) interface, an Ethernet interface or any other communications interface. This access is identified as 5.11. The terminal is provided with memory means 5.8 which may comprise a memory card based on one of the Compact Flash, SD Card or other formats. These means may also comprise a small incorporated hard disk. All these components can interact through a data and control bus 5.9.

A terminal of this kind is therefore capable of receiving digital services comprising multimedia objects broadcast via DVB-H channel 5.10. Multimedia objects so broadcast and received by the terminal can be played back immediately using a screen and loudspeakers, which are not shown. They can also be placed in memory in memory means 5.8 with a view to later playback. This recording in memory is performed in the form of MPEG-4 files in accordance with the process previously described. In particular, missing packets or supplementary data are requested via the interactive channel using interface 5.7. These files can be played back subsequently by the terminal or exchanged with other user devices. These exchanges may be made, for example, through network interface 5.7, or, where the memory means is a removable memory card, by connecting the said memory card to the other device such as for example a computer.

It is also possible to deliberately create incomplete files through a judicious choice of non-recorded information. For example the recording of particular images in a video stream can be omitted, knowing that these will be reconstructed during playback. In this case it may be decided to slightly degrade playback in order to gain storage space when recording. When operating in such a way playback does not indicate the missing packets by displaying the break times, because the reference to the desired strategy for handling the break will indicate a resolution degradation or service degradation technique.

The invention claimed is:

1. A method for placing a multimedia object comprising at least one elemental stream of data in memory by a terminal receiving the said elemental stream or streams, comprising:
   receiving the stream or streams by the terminal in the form of data packets,
      wherein each data packet comprises a data part and a header,
      wherein the header comprises a serial numbers number;
   placing the data parts of the packets received in memory in a data object;
   creating a hint track comprising elemental records,
   wherein an elemental record for a received data packet comprises:
      the serial number of the data packet;
      a timestamp of the data part of the data packet; and
      a pointer to the data part of the data packet within the data object,
   wherein an elemental record for a data packet not received because of transmission errors while receiving the stream comprises:
      the serial number of the data packet;
      an indication that the elemental record corresponds to non-received data wherein the elemental records are ordered by serial number.

2. The method of claim 1, further comprising:
   recovering a non-received data packet after the hint track has been created; and
   updating the elemental record corresponding to the recovered data packet with a timestamp of the data part of the recovered data packet and a pointer to the data part of the the recovered data packet within a data object.

3. The method of claim 2, wherein recovering non-received packets comprises:
   sending a recovery request to a recovery server, and
   receiving the non-received packets in response to the request.

4. The method of claim 1, wherein the non-received packets comprise the entire elemental data stream enabling the multimedia object to be supplemented.

5. The method of claim 1, further comprising:
   placing information relating to the number and location of missing packets in memory.

6. The method of claim 1, wherein each of the transmission errors includes at least one transmission error selected from the group consisting of:
   a packet lost during transmission, and
   a packet received with errors and discarded on receipt due to the errors.

7. A non-transitory computer-readable storage media, on which are stored instructions for causing one or more processors to:
   place a multimedia object comprising at least one elemental stream of data in memory, the elemental stream or streams being capable of being broadcast in the form of data packets comprising a data part and a header comprising serial numbers;
   place the data parts in the stream or streams in memory as a data object;
   create a hint track comprising elemental records corresponding to data packets that can be broadcast,
   wherein each elemental record comprises a serial number of a corresponding data packet and is sequenced in the hint track by the serial number,
   wherein an elemental record corresponding to a received data packet further comprises a timestamp of the data part of the corresponding data packet and a pointer to the data part of the corresponding data packet in the data object, and
   wherein an elemental record corresponding to a data packet that is not received due to transmission errors further comprises an indication that the elemental record is incomplete.

8. The non-transitory computer readable storage medium of claim 7, wherein the elemental record corresponding to a non-received data packet further comprises a pointer to a strategy for handling missing data.

9. The non-transitory computer readable storage medium of claim 7, wherein the instructions stored thereon further comprise instructions for causing one or more processors to display information related to break times when playing back an incomplete multimedia object.

10. A terminal for a receiving a multimedia object comprising at least one data stream received in the form of data packets, the terminal comprising:
    one or more processors;
    a memory in which instructions are stored, the instructions when executed causing one or more of the processors to:
        store a data part of a received data packet in a data object;
        create a hint track comprising elemental records corresponding to data packets,
        wherein an elemental record comprises a serial number of the data packet,
        wherein the elemental records of the hint track are ordered by serial number,
        wherein an elemental record of a received data packet further comprises:
            a timestamp of the data part of the received data packet; and
            a pointer to the data part in the data object, and
        wherein an elemental record of a data packet not received because of transmission errors while receiving data packets further comprises:
            an indication that the data packet was not received.

11. The terminal of claim 10, wherein the instructions stored in the memory further comprise instructions that when executed cause one or more of the processors to:
    display information related to break times when playing back an incomplete multimedia object.

* * * * *

UNITED STATES PATENT AND TRADEMARK OFFICE
CERTIFICATE OF CORRECTION

PATENT NO. : 8,559,788 B2
APPLICATION NO. : 12/153083
DATED : October 15, 2013
INVENTOR(S) : Remi Pecqueur It is certified that error appears in the above-identified patent and that said Letters Patent is hereby corrected as shown below:

In the Claims

Column 11, Claim 1, line 12, delete the word "numbers".

Column 11, Claim 2, lines 34-35, replace "the the" with --the--.

Column 11, Claim 7, line 53, replace "media" with --medium--.

Signed and Sealed this
Tenth Day of December, 2013

Margaret A. Focarino
*Commissioner for Patents of the United States Patent and Trademark Office*